United States Patent
Weiner et al.

(10) Patent No.: US 7,856,140 B2
(45) Date of Patent: Dec. 21, 2010

(54) METHOD, COMPUTER PROGRAM, COMPUTER AND PRINTING SYSTEM FOR TRAPPING IMAGE DATA

(75) Inventors: Helmut Weiner, München (DE); Rüdiger Siemens, München (DE)

(73) Assignee: Oce Printing Systems GmbH, Poing (DE)

( * ) Notice: Subject to any disclaimer, the term of this patent is extended or adjusted under 35 U.S.C. 154(b) by 876 days.

(21) Appl. No.: 11/719,156

(22) PCT Filed: Dec. 23, 2005

(86) PCT No.: PCT/EP2005/057147
§ 371 (c)(1),
(2), (4) Date: May 11, 2007

(87) PCT Pub. No.: WO2006/069980
PCT Pub. Date: Jul. 6, 2006

(65) Prior Publication Data
US 2009/0141972 A1    Jun. 4, 2009

(30) Foreign Application Priority Data
Dec. 27, 2004    (DE) .................. 10 2004 062 841

(51) Int. Cl.
*G06K 9/00* (2006.01)
*G06F 15/00* (2006.01)
(52) U.S. Cl. ........................... 382/167; 358/1.9
(58) Field of Classification Search .............. 382/167; 358/1.9
See application file for complete search history.

(56) References Cited

U.S. PATENT DOCUMENTS

| 5,131,058 | A | | 7/1992 | Ting et al. |
| 5,581,667 | A | * | 12/1996 | Bloomberg .................. 358/1.9 |
| 5,613,046 | A | * | 3/1997 | Dermer ....................... 358/1.9 |
| 6,246,856 | B1 | | 6/2001 | Kopp et al. |
| 6,509,903 | B1 | * | 1/2003 | Yosefi ......................... 345/597 |
| 2001/0033686 | A1 | * | 10/2001 | Klassen ....................... 382/167 |
| 2002/0051156 | A1 | | 5/2002 | Weinholz et al. |

FOREIGN PATENT DOCUMENTS

| DE | 199 12 511 | 9/2000 |
| EP | 0 322 680 | 7/1989 |
| EP | 0 484 890 | 5/1992 |
| EP | 0 833 216 | 4/1998 |
| EP | 0 929 189 | 7/1999 |
| EP | 1 073 261 | 1/2001 |
| WO | WO 98/39691 | 9/1998 |
| WO | WO 2005/001765 | 1/2005 |

OTHER PUBLICATIONS

The Principles of Color—Gerd Goldmann et al—The World of Printers—pp. 233-248—Chapter 8.
Printing Technologies—Gerd Goldman—The World of Printers—Chapter 9—pp. 249-286.
Digital Color Printing—Gerd Goldmann—Chapter 10—The World of Printers—pp. 287-325.

* cited by examiner

*Primary Examiner*—Bhavesh M Mehta
*Assistant Examiner*—Hadi Akhavannik
(74) *Attorney, Agent, or Firm*—Schiff Hardin LLP

(57) ABSTRACT

In a method or computer program product for trapping of image data, the image data in an output image per image point is prepared as color separation data, and the image data is processed.

23 Claims, 16 Drawing Sheets

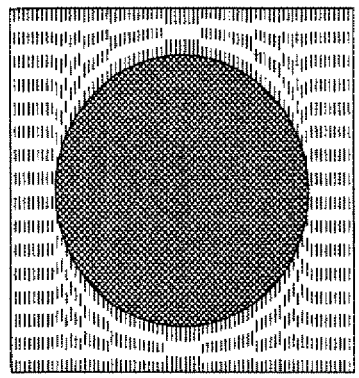
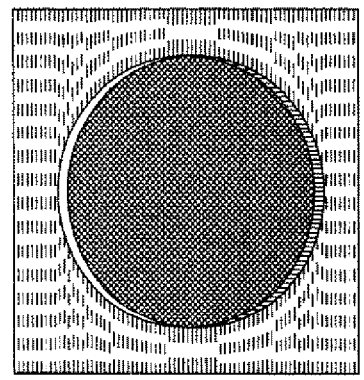
FIG. 1A  FIG. 1B
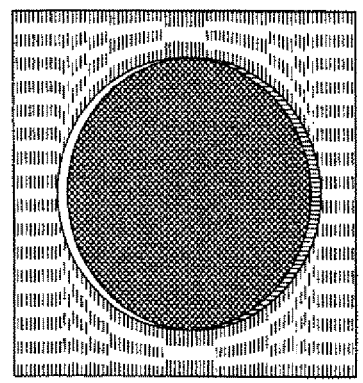
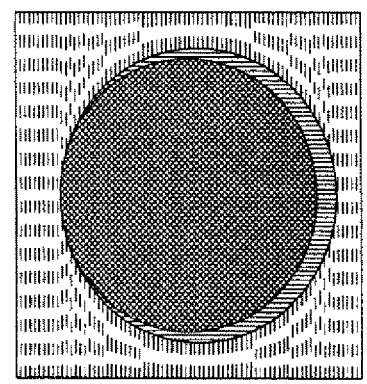
FIG. 2A  FIG. 2B
This color association applies for all Figures
 Yellow    Green    Red    Blue
 Cyan    Magenta    Black

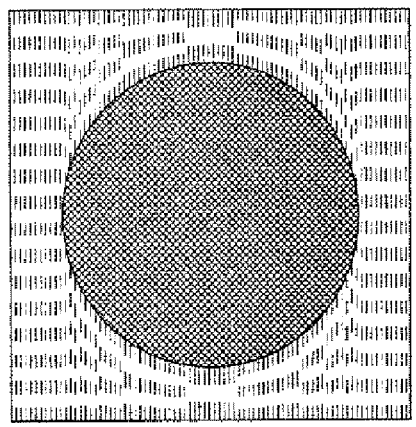
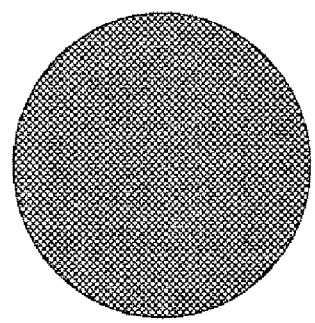
FIG. 7A             FIG. 7B
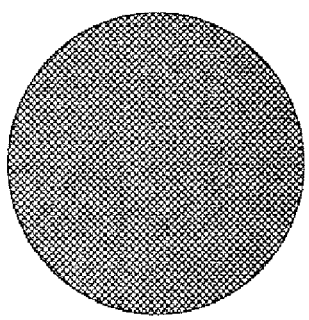
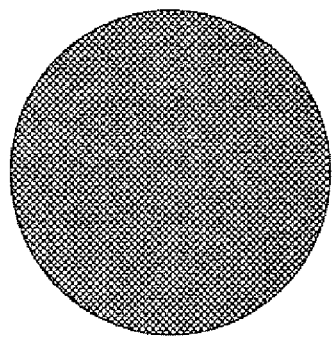
FIG. 8A             FIG. 8B
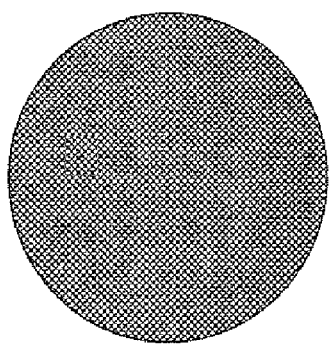
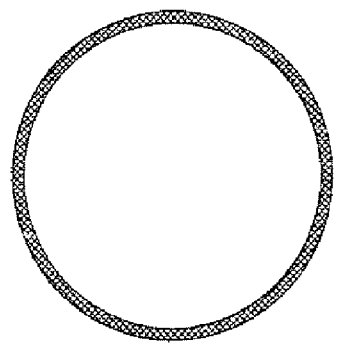
FIG. 9A             FIG. 9B

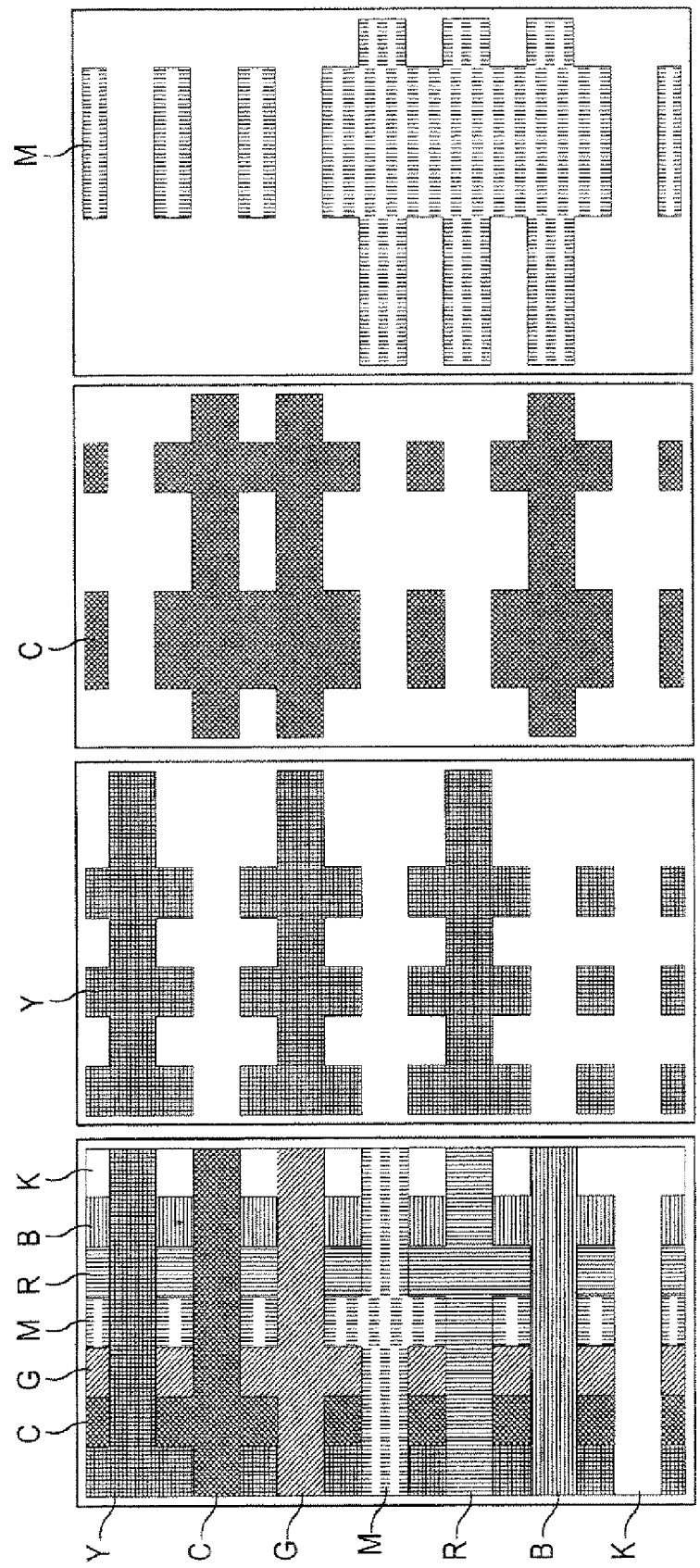

METHOD, COMPUTER PROGRAM, COMPUTER AND PRINTING SYSTEM FOR TRAPPING IMAGE DATA

BACKGROUND

The preferred embodiment concerns a method, a computer program, a computer and a printing system for trapping of image data.

Color documents or document parts (such as, for example, images, color graphics or the like) are for the most part described by image data that are subdivided into color separations. This type of data subdivision in turn corresponds to many print output methods or apparatuses that print the image data in color separations on a recording medium, for example in the colors yellow (Y), magenta (M), cyan (C) and black (K) or in black and one or more of what are known as highlight color colors or the Océ Customer Toner® colors.

OCE Printing Systems GmbH develops and distributes corresponding digital electrographic printing systems. They are, for example, described in the publication "The World of Printers, Technologies of Océ Printing Systems", Dr. Gerd Goldmann (Ed.), Océ Printing Systems GmbH, Poing, 7th edition (2002). Various offset and digital printing technologies are described on pages 249-286, various digital color printing systems are described on pages 287-325 and foundations of color printing are described on pages 233-248. Foundations of digital image processing are described on pages 209-232. Principles of highlight color printing are described on pages 246-248.

A digital printing system for double-sided monochrome and/or color printing of a recording medium is known from WO 98/39691 A1. A method for preparation of an image point file is known from the international patent application Nr. PCT/EP2004/00700 (publication number WO 2005/001765 A2), in which contiguous areas of the image are determined from the image points.

Methods for trapping image data are known from U.S. Pat. No. 5,581,667, EP-A2-484 890, US 2003/0090689 A1, U.S. Pat. No. 4,931,861, EP-A2-929 189, DE-A1-199 12 511, US 2001/0055130 A1 and EP-A2-833 216.

The aforementioned publications are herewith incorporated by reference into the present specification.

What is known as the registration problem is present both in digital printing and in offset printing. It thereby deals with the circumstance that, given a plurality of printing processes and given one sheet of paper, due to mechanical tolerances it cannot be guaranteed that the positioning of the paper is always exactly the same in all printing processes. The problem occurs in single-color printing when the front side and the rear side are printed separately or given multi-color printing on one side.

In front side and rear side printing this problem interferes when, for example, one frame per front side and rear side is printed and these frames do not lie exactly atop one another, which one notices when the page is held up to the light.

Given multicolor printing the colors are offset relative to one another. As long as the different colors do not touch, this does not stand out any further. If the colors touch, due to the offset the colors are printed over one another at the contact line, which leads to an adulteration of the color impression, or a white gap (flash) remains at the contact line.

While the adulteration of the color impression is for the most part still tolerable, the flashes are extremely conspicuous, as is shown by the comparison of exactly positioned colors in FIG. 1A and colors positioned offset in FIG. 1B.

To remedy the flashes problem it is known to enlarge or spatially over-fill the lighter colors. Although a greater superimposition of the colors is therewith obtained, the flashes disappear, as is shown by the comparison of colors positioned offset in FIG. 2A and superimposed colors in FIG. 2B. Given the enlargement of an object, in the later printing process care must be taken that the superimposing portion is printed transparent since otherwise the problem shifts to the edge of the enlarged object.

The method just described, which method remedies this problem, has the name "trapping" (overfilling). Trapping is offered in different products on the market. For example, it is a component of raster image processors (RIPs) of the page description language (PDL) Adobe PostScript® Level 3, the software SuperTrap® offered by the company Heidelberger Druckmaschinen AG or the software TrapWise® that is offered by the company Creo.

Trapping can be implemented in two different manners. Trapping can be dealt with on the object level or on the bitmap level.

SUMMARY

In a method or computer program product for trapping of image data, the image data in an initial image per image point is prepared as color separation data, and the image data is processed.

BRIEF DESCRIPTION OF THE DRAWINGS

FIGS. 1A and 1B show conspicuous flashes by comparison of exactly positioned colors in FIG. 1A and colors positioned offset in FIG. 1B;

FIGS. 2A and 2B show the disappearance of flashes by the comparison of colors positioned offset in FIG. 2A and superimposed colors in FIG. 2B;

FIGS. 7A and 7B illustrate that pixel data experience a corresponding image transformation;

FIGS. 8A and 8B illustrate that only one, and at most two, pixels enlargement is required for the trapping problem;

FIGS. 9A and 9B illustrate for the example of cyan a step of filter enlargement given darker colors that do not contain a current color;

FIGS. 12A, 12B, 12C, and 12D respectively show the original image, the color separation for yellow, the color separation for cyan, and the color separation for magenta;

DESCRIPTION OF THE PREFERRED EMBODIMENT

Figure 3:
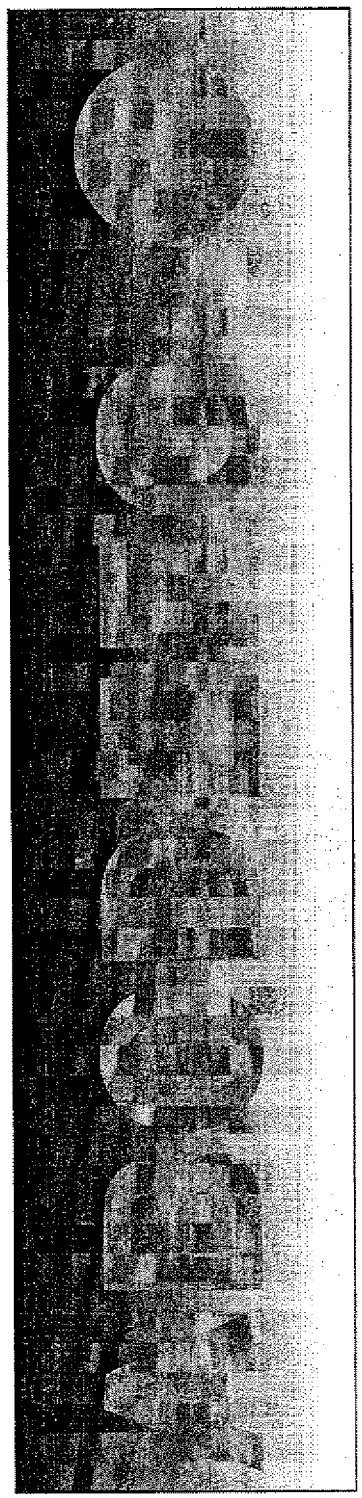
FIG. 3 shows that it is not ensured that an object at each point always has the same color, rather it can also have a color gradient so that the object is brighter at one point than the neighboring object and darker at another point.

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, and such alterations and further modifications in the illustrated device and such further applications of the principles of the invention as illustrated as would normally occur to one skilled in the art to which the invention relates are included.

The present preferred embodiment in particular concerns the problem of trapping on the bitmap level from performance points of view that are in particular relevant for a frictionless and efficient workflow of a printing process given high print volumes and complex documents.

The preferred embodiment also concerns a trapping method for what are known as highlight color images or, abbreviated, HLC images. Such images define colors in a color space specific to them, in which color space at least one color comprises a specific color tone that normally lies apart from its typical pigment. This color tone can, for example, be an application-specific color tone (for example for a color company logo) and/or be adapted such that it allows access to color tones that cannot be achieved with standard printing colors such as, for example, yellow (Y), magenta (M), cyan (C) and black (K). For example, the applicant distributes such highlight color toner for electrographic printers under the trade name Oce Custom Tone®.

A standard color and an HLC color can also be printed at different brightness levels or color saturation values given highlight color printing. The standard color is normally black and is printed in different grey levels.

Highlight color printing is more cost-effective than a full-color printing with four primary colors (what is known as four color printing) in which the most varied colors can be achieved via superimposition printing of the primary colors cyan, magenta, yellow and black. Given four color printing it is disadvantageous that the luminosity of the colors that can be printed is limited in spite of the color variety. Often a luminosity required by a customer (and therewith a customer-specific special color) frequently cannot be achieved in four color printing methods, primarily in the ranges red, green and blue.

Since often only a special color is desired, for such applications it is significantly more reasonable to use special printing colors that exhibit the desired color when they are printed over the entire surface on the paper.

If two colors abut one another on one side, due to imprecise positioning of the various color separations (registrations) it can lead to superimposition of the colors (which leads to dark edges) or to a gap between the colors (which leads to the white interspaces (flashes) already mentioned above. While dark edges are normally still tolerable, flashes draw attention to themselves in an extremely disruptive manner.

Given trapping the object belonging to one of the two participating colors is enlarged by one or more pixels. One of the corresponding colors is normally lighter than the other. If the object with the darker color is enlarged, a definitively larger object is created which likewise attracts more attention in a disruptive manner. If the object of the light color is enlarged, it does not lead to such an optical enlargement since the object is overlapped by the darker color of the other object. For this reason only the lighter objects are thus normally enlarged.

However, in practice the problem is significantly more complex. Given colors of the same brightness or luminance the problem of selecting which object should be enlarged remains extant, and precisely such cases lead for the most part to color alterations in the overlap. It is also not ensured that an object at each point always has the same color; rather, it can also have a color gradient so that the object is brighter at one point than the neighboring object and darker at another point, as shown in FIG. 3.

The example of FIG. 3 shows that the letters are lighter than the background at the upper edge and are darker at the lower edge. In this case the letters in the upper region would have to be enlarged while the background would have to be enlarged in the lower region. If one takes the letters as text (not as a bitmap), this means that a new font is required in which all letters are enlarged only in the upper region.

Figure 4:
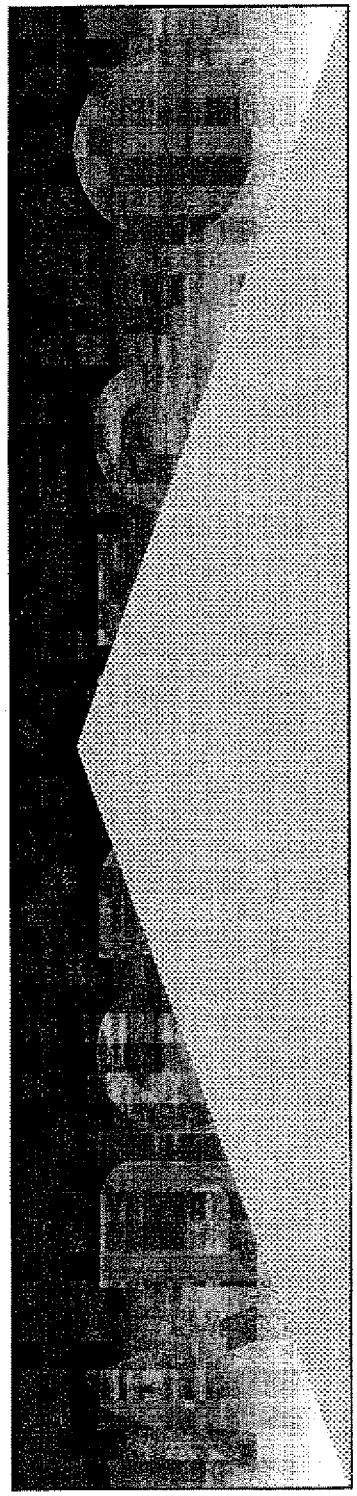
FIG. 4 shows overlap of further objects.

If one thus desires to implement trapping at the object level, standard objects can no longer be used; rather, for example, new fonts must be defined or even new geometric figures such as, for example, when a circle enlarged in only the upper half is from a circle. The number of the various objects used then increases severely, in particular when further objects overlap (as shown in FIG. 4).

Precisely given many overlaps, the alterations of the objects placed first depend on objects placed later. Objects must therewith frequently be manipulated if applicable.

Figure 5:
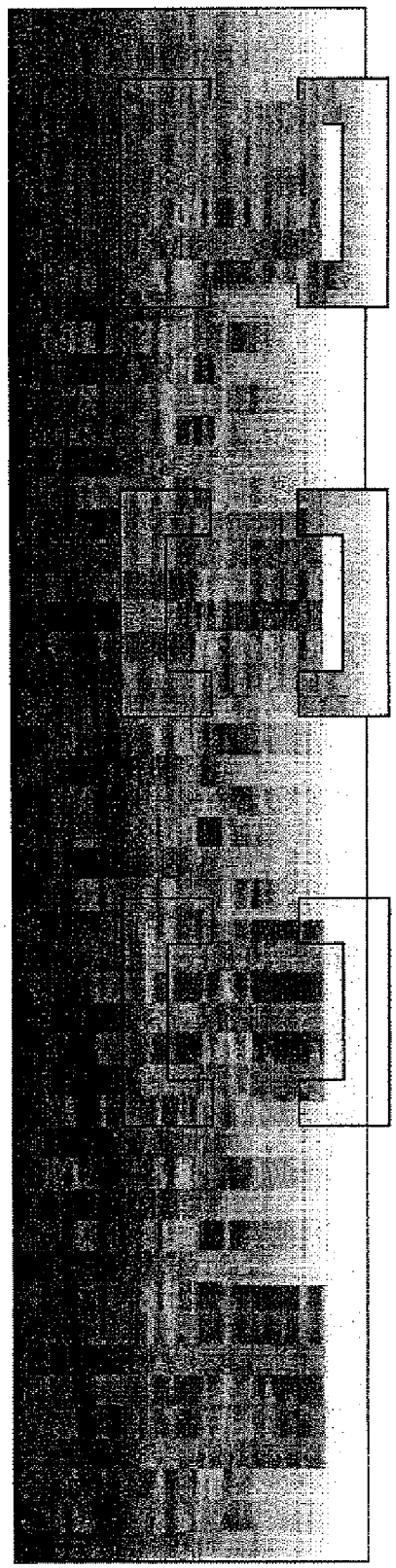
FIG. 5 shows that additional trapping objects can also be defined that precisely correspond to contours of the objects.

Instead of the alteration of existing objects, additional trapping objects can also be defined that precisely correspond to the contours of the objects as shown in FIG. 5.

Since such additional objects are required at all border lines, in particular also given text, this leads again to an enormous increase of objects that can additionally be extremely complicated due to complex curve direction or due to specification of color gradients.

Moreover, trapping means not only over-filling but rather can also mean under-filling. For example, large black areas can thus for the most part be mapped not only to pure black but rather additionally with a raster of a different color (for example cyan). This typically occurs in color management. If white text is then printed on the black surface, the cyan points can protrude into the white region, such that such a cyan raster (not the black area) must be shrunk at the edges. Since the CMM in the printer reacts only to the profile and always correspondingly fills the actual size of the area with all specified colors, here additional white contour objects must be inserted at the edges, which additional white contour objects act only on the cyan plane and not on the other planes. A trapping tool must thus in particular, evaluate the employed profiles and generate corresponding new objects.

A trapping on the object level in particular leads to a very complex processing and to an unmanageable increase of the object count, partially with new properties.

Trapping on the bitmap level proves to be significantly simpler. If the objects are mapped in succession to the background, each edge pixel of the current object can thus be immediately compared with the current background and thus it can simply be decided at which point the object is to be enlarged and at which point the background is to be enlarged.

It is an object to simplify the trapping of image data, in particular bitmap trapping.

According to the preferred embodiment, in a method for trapping of image data the image data in an initial image are prepared pixel-by-pixel as color separation data (in particular as a plane bitmap and/or as per-point primary color data) and the image data are processed.

According to a first aspect of the preferred embodiment, according to an object rule objects with adjacent additional image points are generated around image points or pixels of various color separations of the initial image, whereby extended color separation data are created. The adjacent additional image points of a color separation are then compared per image point with the corresponding image points of the initial image and, dependent on the image data of the corresponding image point of the initial image, a decision is made per additional image point as to whether corresponding color separation data of the initial image image point are extended by a value corresponding to the additional image point for generation of a target image point value.

According to a second aspect of the preferred embodiment that can be viewed independent of or also in combination with the first aspect, according to an object rule objects with adjacent additional image points are generated around image points of various color separations of the initial image, whereby extended color separation data are created. The adjacent additional image points of a color separation are then compared per image point with the corresponding image points of the initial image and, at the coordinate of the adjacent image point, a decision as to whether the additional image point is placed in the present color separation is made dependent on the data of the corresponding initial image image point.

According to a further aspect of the preferred embodiment, measures are specified with which highlight color data can be effectively trapped, in particular for data with one, two or three highlight color colors, which can in particular occur in connection with black.

With the preferred embodiment it is in particular possible to implement a trapping on the basis of bitmaps. A preferred exemplary embodiment thereby analyzes the bitmaps such that contiguous areas can be determined and identified as image objects. Although the preferred embodiment accordingly applies given incoming bitmap data, after the detection of the image objects measures can be taken that are known from object-based trapping methods.

According to an advantageous exemplary embodiment, at the start color separations of the colors yellow (Y), magenta (M), cyan (C) and black (K) are prepared and the image data of the colors yellow, magenta and cyan are transformed into a color space of the colors yellow (Y'), magenta (M'), cyan (C'), red (R'), green (G') and blue (B'). The transformation can thereby in particular occur according to the following rules:

| C' = | C & ~M & ~Y & ~K = | C & ~(M \| Y \| K) |
|---|---|---|
| M' = | M & ~C & ~Y & ~K = | M & ~(C \| Y \| K) |
| Y' = | Y & ~C & ~M & ~K = | Y & ~(C \| M \| K) |
| R' = | M & Y & ~C & ~K = | M & Y & ~(C \| K) |

-continued

| G' = | C & Y & ~M & ~K = | C & Y & ~(M \| K) |
|---|---|---|
| B' = | C & M & ~Y & ~K = | C & M & ~(Y \| K), | whereby the capital letters respectively designate a matrix of the image points of the associated color separations with the corresponding initial letters and K designates black.

In a further development of the preferred embodiment, objects with adjacent additional pixels are generated from the image points of the color separations yellow, magenta and cyan but not from the image points of the color black.

According to an advantageous embodiment, the transformed image data are processed in a second step according to the rules $$C''=V(C), M''=V(M'), Y''=V(Y'), R''=V(R'), G''=V(G'), B''=V(B'),$$

whereby V designates a rule for the generation of the objects with extended image points.

The rule V for generation of the objects extended per point can in particular be executed according to a teaching specified in the international patent application PCT/EP2004/007000. It specifies a method for preparation of an image point file in which certain image points are placed for representation of graphic and/or text information and comprises the following steps:

mapping of the image point file to a mapping file, whereby all image points of the mapping file that lie within a predetermined distance d of corresponding image points in the image point file are placed and determination of all contiguous regions of image points placed in the mapping file, whereby every such contiguous region represents an image object.

In the present preferred embodiment, the image point file in particular corresponds to the file in which the pixel values of one plane are stored.

The image points in the image point file and in the mapping file are in particular arranged in rows and columns. Two differing partial methods for determination of image objects are cited in PCT/EP2004/007000, namely an iterative method and a particularly preferred method that is based on the analysis of color transitions. In particular a table with one-dimensional image point patterns can thereby be provided, whereby a corresponding mapping point pattern is associated with each image point pattern; whereby groups of image points of one row of the image point file are compared with the image point patterns given the mapping in the direction of the rows; and whereby the mapping point pattern corresponding to the coinciding image point pattern is entered into the corresponding row at the corresponding position of the mapping file with an OR-link. The distance d can be automatically varied dependent on the font size and/or the rastering and/or the granularity.

The method described in PCT/EP2004/007000 has been described there in connection with the correction of image errors (what are known as speckles) in the scanning of documents. According to an advantageous embodiment, it was recognized that this method (in particular its rules for extension of an image point area) could also be used for the rules for forming an object with additional image points from a bitmap file in the present preferred embodiment. To clarify this aspect, the entire disclosure of PCT/EP2004/007000 is herewith incorporated by reference into the present specification and the text passage from page 14, lines 1 through 26 is subsequently reproduced:

"The extension of the original image points with extension image points in the column direction (FIG. 2a, 2b, FIG. 8a, 8b) is advantageously executed via an OR-linking of adjacent rows given a mapping file in which the image points are arranged in rows and columns. A set original image point in the column direction is mapped to an adjacent row with such an OR-linking. In order to set the corresponding extension image points in the column direction in the region delimited by the distance d around an original image point, the OR-linking is executed on all rows above and below this region.

A table with one-dimensional image point patterns is advantageously used for simple and fast extension of the original points with extension image points in the row direction. A corresponding mapping point pattern is associated with each image point pattern in this table. Given the extension mapping, groups of image points of the row of the image point file are read out in the direction of said row and compared with the image point patterns. The mapping point pattern corresponding to the coinciding image point pattern is entered into the corresponding row at the corresponding position in the mapping file with an OR-link. Entire groups of image points of the image point file can hereby be quickly and simply mapped to extended image points of the mapping file."

According to a further advantageous aspect of the preferred embodiment, the following rules are used for the decision as to whether corresponding color separation data of the initial image image point are extended by a value corresponding to the additional image point to generate a target image point value:

| | | |
|---|---|---|
| C''' = (M \| K) & C'', | M''' = | K & M'', |
| Y''' = (C \| M \| K) & Y''' | R''' = | ((M & C) \| K) & R'', |
| G''' (M \| K) & G'' | B' = | K & B''. |

Furthermore, intermediate image data can be determined per image point from the image data of the initial image points and the additional image points. The intermediate image data can in particular be determined according to the following rules:

| | |
|---|---|
| C'''' = C''' \| C', | M'''' = M''' \| M', |
| Y'''' = Y''' \| Y', | R'''' = R''' \| R', |
| G'''' = G''' \| G', | B'''' = B''' \| B' |

The target image data are in particular calculated from the intermediate image data, and furthermore in particular according to the rules

| |
|---|
| C''''' = C'''' \| G'''' \| B'''', |
| M''''' = M'''' \| R'''' \| B'''', |
| Y''''' = Y'''' \| R'''' \| G''''. |

The image data are advantageously formed per image point as binary or as bi-level or as two-stage data, however can also be formed per image point more as two-stage or as multi-level data.

According to a further advantageous aspect of the preferred embodiment, it was recognized that the trapping of the preferred embodiment for a document page is to be effected particularly simply (in terms of computer technology) and thus at least partially automatically when the complete page is already rastered, in particular when the trapping is implemented (in terms of data) on bitmaps, and therewith the color separations (the CMYK planes) are entirely known; then for every point it can be relatively easily examined whether an abutting point is lighter or darker and correspondingly whether the neighboring point is inked or not. The trapping is accordingly in particular implemented on bitmaps, whereby, for example, the data processing speed is also high.

The preferred embodiment can in particular be realized as a computer program that effects a method workflow upon its loading and execution on a computer and/or as a computer on which such a computer program is loaded. Furthermore, the preferred embodiment can be realized as a printing system with such a computer. The computer can thereby in particular be designed as a raster image processor (RIP).

Exemplary embodiments are subsequently described from which further effects and advantages are clear.

As further already mentioned above, trapping can in principle be realized differently. Fundamentally, it is to be differentiated whether the object is to be trapped at the object or bitmap level.

At the object level the trapping occurs before the ripping. The existing objects are altered or new objects are added at the edges of the existing objects. New objects are colored and mapped dependent on the original objects.

At the bitmap level the trapping in particular occurs after the ripping and separation and possibly also after the screening. The existing objects are thereby completely rastered via the ripping process, such that only a single bitmap remains for a page. All overlaps have thereby already been taken into account, such that only the final color transitions are visible on the bitmap. The trapping now must attend to the complete bitmap and detect color transitions without knowledge of the objects and, corresponding to the original colors, alter the colors of the bitmaps in the separated color separations in proximity to the color transitions. However, the trapping can also occur independent of a ripping, separation or screening of bitmap objects of a PDL data stream that are integrated into the data stream, for example independent of screen shots, graphics or also photos with sharp color transitions.

Methods

Trapping Methods:
  Object trapping
    Alteration of the objects
    Addition of objects
  Bitmap trapping
    After the separation
    After the screening
    Multi-level
    Bi-level Object Trapping There are some advantages in the trapping of objects, but also disadvantages.

If two objects abut one another, all points of the boundary line are thus to be considered with regard to the color differences. If the objects overlap opaquely, all points of the border line of the upper object are thus to be considered with regard to the color differences from those underlying this line. If the objects overlap transparently, the transparency also has influence on the visible colors and therewith on the trapping. To assess how the trapping must be implemented, in this case the upper object must already be transparently mapped. However, each two objects only have to be compared at their edge, which leads to significantly less effort given a few objects than given the trapping of bitmaps. If the objects are known, one can manually decide how the trapping should be implemented in critical cases, while such an individual setting is not possible given bitmaps.

However, objects can also be bitmaps. Bitmaps are normally not dealt with given the trapping of objects although here a trapping can also be necessary. For example, all employed objects can be ripped and then the generated bitmap can be used for the document instead of the objects. The trapping is likewise necessary given such documents. In principle the procedure to rip such documents cannot always be applied before the trapping since sometimes one has no access to the actual original (for example when a bitmap originates from the Internet).

Trapping of objects allows a processing dependent on the type of an object. In general objects of the type "character" (fonts) can thus be treated differently than, for example, objects of the type "area" or "line".

Given the trapping objects the algorithm must know the employed syntax for the object specification. The trapping is therewith strongly dependent on the employed input language.

Since in principle two objects can touch or overlap, two objects on a page must be respectively tested to this effect. The number of the tests corresponds to the selection of 2 from n objects, whereby n is the number of all objects of the page. This corresponds to a number of $n*(n-1)/2$ tests (quadratic expenditure with n). The numbers of the characters are very large (particularly given text) and for the most part lie between 2000 and 4000. This corresponds to 2 to 8 million tests.

Figure 6A:
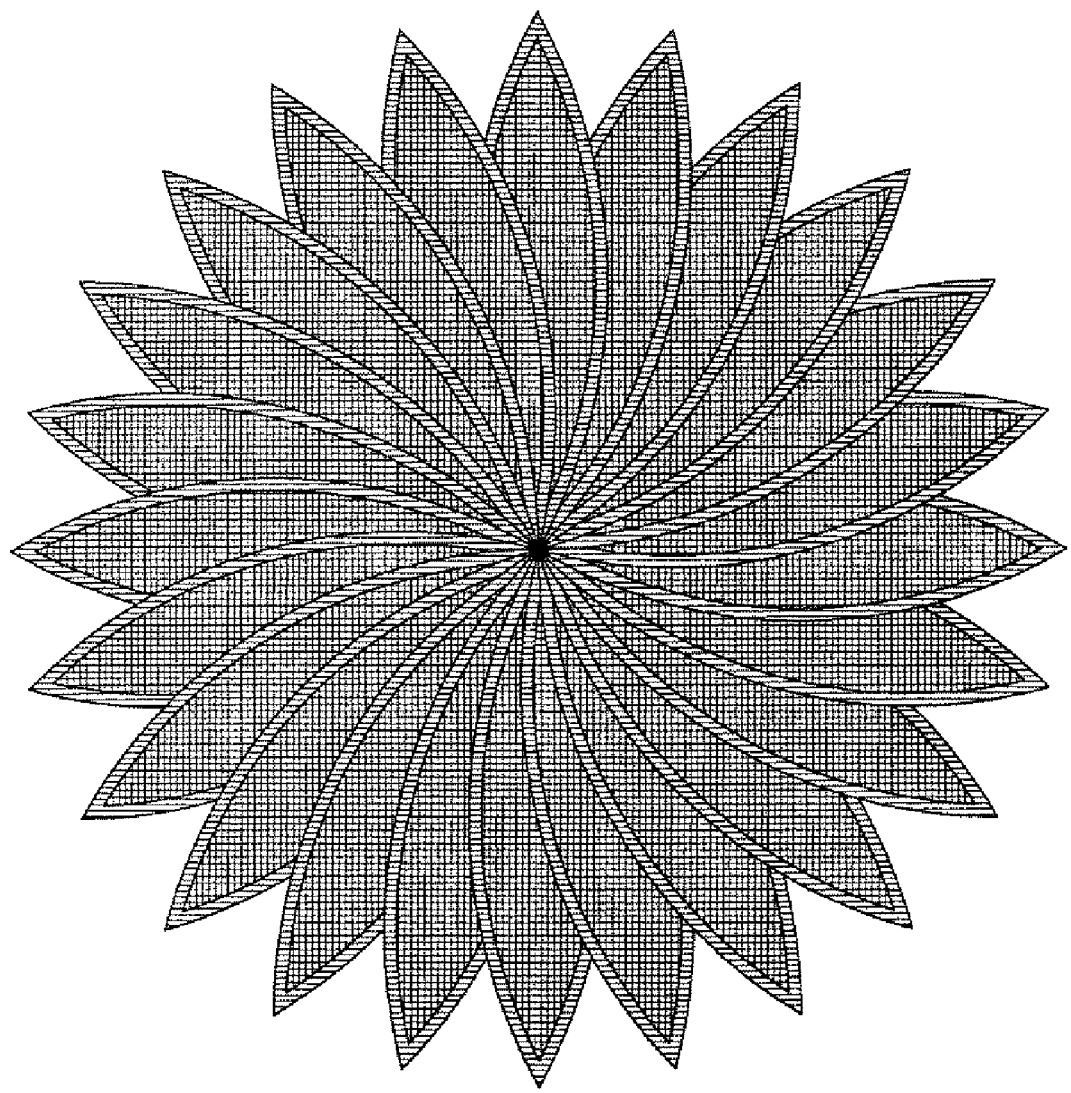
FIG. 6A shows a problem which results given graphics where flowers are shown as an example.
Figure 6B:
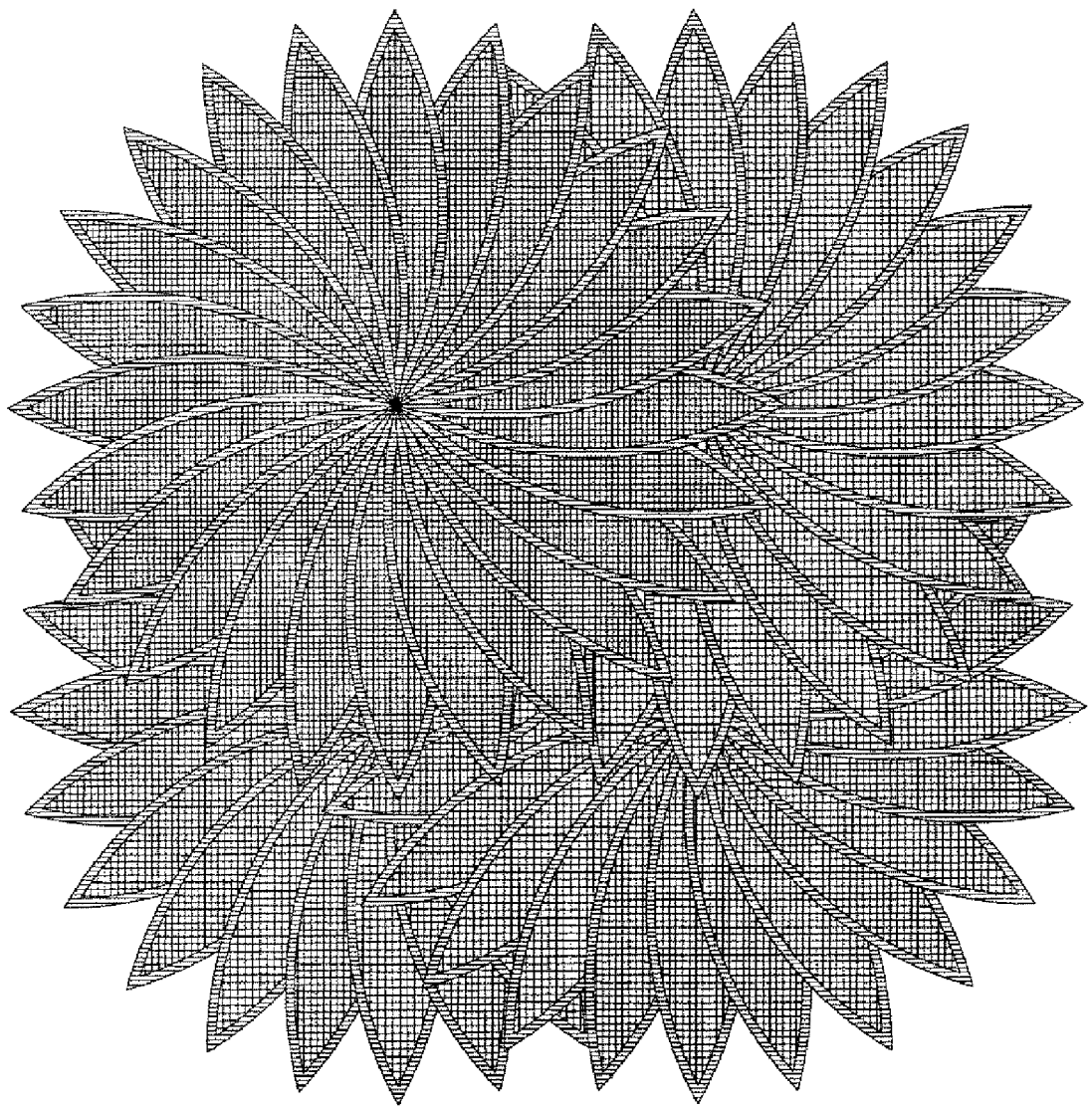
FIG. 6B shows a bouquet of flowers with respective flower overlap.

Letters normally do not overlap, however one cannot be sure of this, such that such tests are always incurred. A further problem is added given graphics. The flowers shown in FIG. 6A show an example. Although the flowers comprise only 24 uniform and identically colored petals, each petal is, however, built from 4 objects, namely two blue edges of varying curvature and two yellow half-centers per flower. This leads to the situation that 98 objects must be considered, which corresponds to 4753 tests. If the number of the petals is doubled, already 19110 tests must be implemented. If not only individual flowers but rather a bouquet of four flowers is now considered wherein the flowers respectively overlap (FIG. 6B), one obtains 76636 tests given 24 petals and 294528 tests given 48 petals. These tests are thereby also due when individual objects are completely covered and not visible.

Due to the simple handling in the generation of such structures in the tools, today larger objects made up of many individual objects can be built quickly (copy and paste).

A flower meadow with 100 flowers thus already leads to over 48 million tests or, given 1000 flowers, to more than 48 billion tests. If the methods of the insertion of objects are used, 48 billion objects can additionally quickly be found from the 1000 flowers (98000 petals) when the occluded objects are not eliminated (which, however, again entails additional effort). If the methods of the alteration of the existing lighter objects is used, no further objects are incurred in this case. Therefore the problem in the case of overlapping characters exists in that trapped, half-covered characters in no font are present and thus such characters are to be generated as bitmaps, or a flood of new fonts to be generated is required.

Bitmap Trapping

There are likewise advantages and disadvantages in the trapping of bitmaps.

Since the objects are no longer known given bitmaps, object-specific individual trapping properties cannot be set. At most regions of a page can be established that should be correspondingly handled differently. Due to the expenditure that a manual intervention in an automatic workflow entails, however, object-specific individual settings are in principle generally discouraged.

In the test of a bitmap the bitmap represents the result of the mapping of the objects and there is no longer atop one another of objects. The expenditure is thus as a start independent of the number of objects.

Each pixel of the bitmap must therefore be tested with every adjacent pixel. The number of the pixels to be considered depends on the resolution of the bitmap. At 600 dpi, there are approximately 34.8 million pixels, which corresponds to approximately 139.2 million tests. Tests of pixels are normally significantly simpler than tests of objects. By utilizing the width of registers, the effort for the processing of bitmaps can in particular be significantly reduced. Given the trapping of bitmaps, incorporated images are automatically trapped as well (suppression via specification of regions is possible). Bitmaps exist in several formats or exist in memory as a separate data stream after the ripping and separation. A dependency on the language does not exist. If the trapping is used before the screening, four eight-bit-deep planes must thus normally be accounted for, which corresponds to a comparison of 32 bits. Here the trapping can still be implemented dependent on the brightness of the color. A pixel can have any of four billion color combinations of the colors C, M, Y and K. If the trapping is used after the screening, it must still be differentiated whether it is a bi-level or a multi-level printer. Given a multi-level printer, only four four-bit-deep planes must still be taken into account. This means an effort reduction by a factor of two. Here only a trapping dependent on the brightness of the primary colors in the multi-level stages is still possible. A pixel can only have one of 64 K color combinations of the colors C, M, Y and K. Given a bi-level printer, only four one-bit-deep planes must be considered. This means an effort reduction by a factor of eight. Here only a trapping dependent on the brightness of the primary colors is still possible. A pixel can have only one of 16 color combinations of the colors C, M, Y and K. A bitmap trapping should have a constant effort for a specific plane depth at a specific resolution (independent of the number of objects and independent of content, that is color transitions).

Method

In the bi-level case, given full-color data the input data exist in four one-bit-deep planes. The method can be employed analogously or be extended for multiple highlight color (HLC) data. Each pixel can possess only one of the 16 colors (combinations of the four primary colors cyan, magenta, yellow and black). Given a one-bit trapping, the color of each pixel is to be compared with the color of each of the adjacent eight pixels and the color is possibly to be changed. If such a method is directly implemented as described, for one DIN A4 page at 600 dpi 4960*7015=34.8 million pixels are respectively to be compared with the eight neighbors. Since each neighbor is always also compared with the original, all comparisons are implemented doubly so that half can be spared in that one only compares with the right and the lower neighbors. Given each comparison it is to be considered that both the pixels to be compared and the neighbor pixels can possess one of 16 colors, thus 256 color combinations are to be checked. If, given a pixel, the value is set in the black plane and in at least one further plane, the result is thus black, such that one can treat all of these cases precisely as if the value were only set in the black plane. The number of the colors is thus halved to 8, such that only 64 color combinations are to be checked.

Even in such a simple bi-level case, there are so many operations that an implementation in the printed does not appear to be reasonable. For this reason a different approach is described here in five steps. For this a detailed example is specified further below using FIGS. 12 through 20.

Step 1: Filtering of the Pure Primary Colors

Here one is first interested in all pixels that possess pure primary colors. Here one designates the colors cyan, magenta, yellow, red, green and blue as primary colors. Here we initially does not consider black and white as primary colors.

For cyan these are all pixels for which a bit is set in the cyan plane but no bit is set in all other planes. The same analogously applies for magenta and yellow. For red these are all pixels for which a bit is set in the magenta plane and in the yellow plane but no bit is set in all other planes. The same analogously applies for green and blue.

From the existing four planes (C, M, Y, K) one can thus generate further planes (C', M', Y', R', G', B') with (~ indicates negation, from 0 to 1 and from 1 to 0; | means OR or union; & means AND or section):

| | | |
|---|---|---|
| C' = | C & ~M & ~Y & ~K = | C & ~(M \| Y \| K) |
| M' = | M & ~C & ~Y & ~K = | M & ~(C \| Y \| K) |
| Y' = | Y & ~C & ~M & ~K = | Y & ~(C \| M \| K) |
| R' = | M & Y & ~C & ~K = | M & Y & ~(C \| K) |
| G' = | C & Y & ~M & ~K = | C & Y & ~(M \| K) |
| B' = | C & M & ~Y & ~K = | C & M & ~(Y \| K) |

Only the pure primary colors and no combination colors occur in these planes. Each image point or each pixel that is not only black (or white) is accordingly represented in these six primary colors (planes). The pixel data experience a corresponding image transformation. FIGS. 7A and 7B illustrate this.

Step 2: Enlargement

In a second step the contents of the planes of the first step are enlarged into objects with additional image points. For this one may use the algorithm or the method that is described in PCT/2004/007000, whose content is herewith again explicitly incorporated by reference at this point. Contiguous objects of the planes can thus be enlarged by up to 24 pixels. However, only one, at most two, pixels' enlargement is required for the trapping problem. FIGS. 8A and 8B illustrate this.

$$C''=V(C'), M''=V(M'), Y''=V(Y'), R''=V(R'), G''=V(G'), B''=V(B')$$

Step 3: Filter Enlargement given Darker Colors that do not Contain the Current Color This enlargement was implemented without consideration of the neighboring pixels. One is initially interested only in the pixels that are actually newly added. These are precisely the pixels which do not contain the current primary color and that overlap with darker colors. For this one must arrange all primary colors in the order of their luminance:

$$L(W)>L(Y)>L(C)>L(G)>L(M)>L(R)>L(B)>L(K)$$

Y is the lighter primary color, thus lighter than C, G, M, R, B and K. Because E=M+Y, G=C+Y a B=M+C, R, G and B are already contained in the C, M and Y planes, meaning that an image point of the colors red, green or blue can respectively be entirely represented with coordinates in the planes C, M and Y. Y as a current color is not taken into account because only the enlargements of relatively darker colors are considered, such that only C, M and K are considered for the section. C, M and K are thus therewith ORed and sectioned by Y" in order to obtain Y''', whereby W=white and K=black.

C is the next darkest primary color, thus lighter than G, M, R, B and K. C as a current color is not taken into account, such that only M and K are considered for the section. M and K are thus therewith ORed and sectioned with C" in order to obtain C'''.

In the multi-level case (more than 2 brightness levels per image point in a plane) the brightness must be sorted corresponding to their color and their brightness level, whereby in terms of the brightness there can be intersections between various planes. For three brightness levels per image point these could appear so:

$$L(K0)>L(Y0)>L(Y1)>L(Y2)>L(C0)>L(G0)>L(M0)>L(C1)>L(G1)>L(R0)>L(M1)>L(B0)>\ldots>L(K2)$$

Back to the bi-level case: G is the next darkest primary color, thus lighter than M, R, B and K. G as a current color is not taken into account, such that only M and K are still considered for the section due to G=C+Y. M and K are thus therewith ORed and sectioned with G" in order to obtain G'''.

M is the next darkest primary color, thus lighter than R, B and K. M as a current color is not taken into account, such that only K is still considered for the section. K is thus therewith sectioned with M" in order to obtain M'''.

R is the next darkest primary color, thus lighter than B and K. R as a current color is not taken into account, such that only B=M+C and K are still considered for the section. M and C are thus therewith sectioned, ORed with K and sectioned with R" in order to obtain R'''.

B is the next darkest primary color, thus lighter only than K. B as a current color is not taken into account, such that only K is still considered for the section. K is thus sectioned with B" in order to obtain B'''.

| | | | | | |
|---|---|---|---|---|---|
| C''' = | (M \| K) & C", | M''' = | K & M", | Y''' = | (C \| M \| K) & Y" |
| R''' = | ((M & C) \| K) & R", | G''' = | (M \| K) & G" | B''' = | K & B" |

FIGS. 9A and 9B illustrate this step in the example of cyan.

Step 4: Mixing with Pure Original Primary Colors

It still remains to respectively add the original primary color to the R''', G''', B''', C''', M''' and Y''' planes.

| | | | | | |
|---|---|---|---|---|---|
| C'''' = | C''' \| C', | M'''' = | M''' \| M', | Y'''' = | Y''' \| Y', |
| R'''' = | R''' \| R', | G'''' = | G''' \| G', | B'''' = | B''' \| B'. |

Figure 10A:
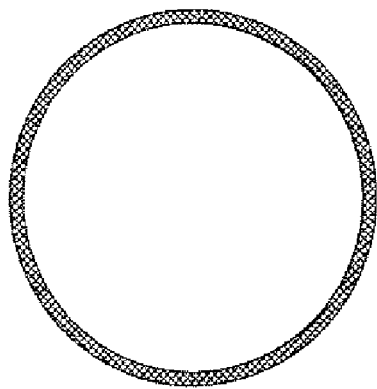
FIGS. 10A and 10B illustrate the step of mixing with pure original primary colors.
Figure 10B:
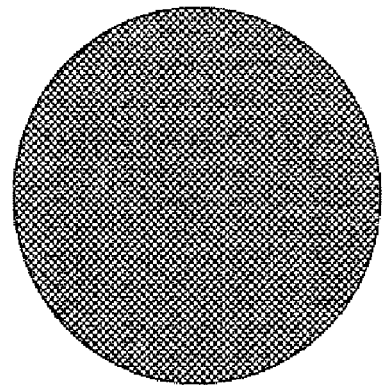
Figure 11A:
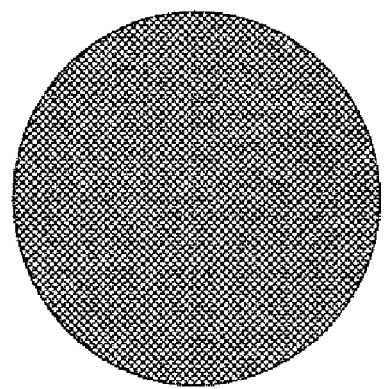
FIGS. 11A and 11B are further examples.
Figure 11B:
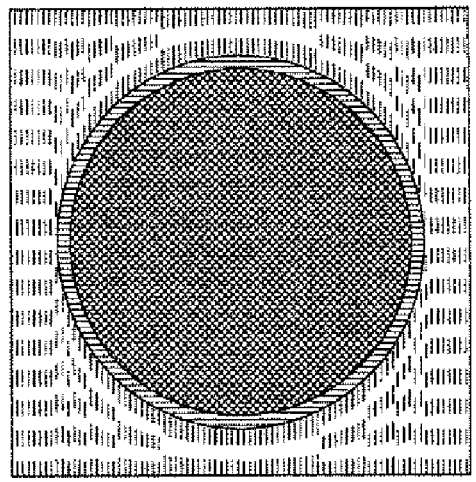

FIGS. 10A and 10B illustrate this.

Figures 19A, 19B, 19C:
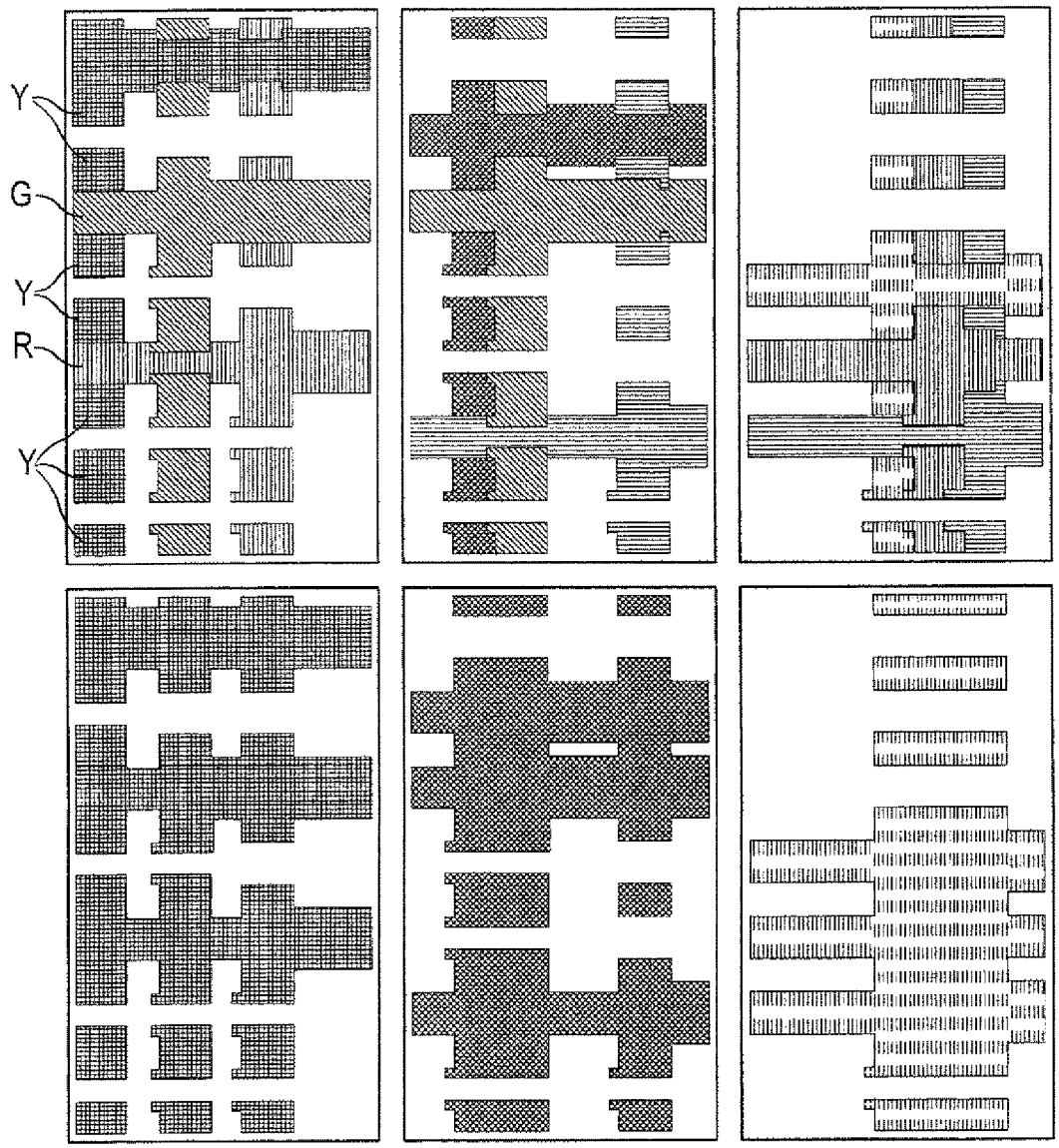
FIG. 19A shows step 5 for the yellow color separation.
FIG. 19B shows step 5 for the cyan color separation.
FIG. 19C shows step 5 for the magenta color separation.

The steps 1 through 4 are implemented for each primary color (see also FIGS. 19A through 19C).

DETAIL EXAMPLE

An image is examined in which the primary colors occur in vertical and horizontal stripes (from the top down or from left to right) in the order of their luminance Y, C, G, M, R, B, K, such that all possible color transitions occur twice. FIG. 12A shows the original image, FIG. 12B the color separation for yellow, FIG. 12C the color separation for cyan, and FIG. 12D the color separation for magenta.

Figure 13:
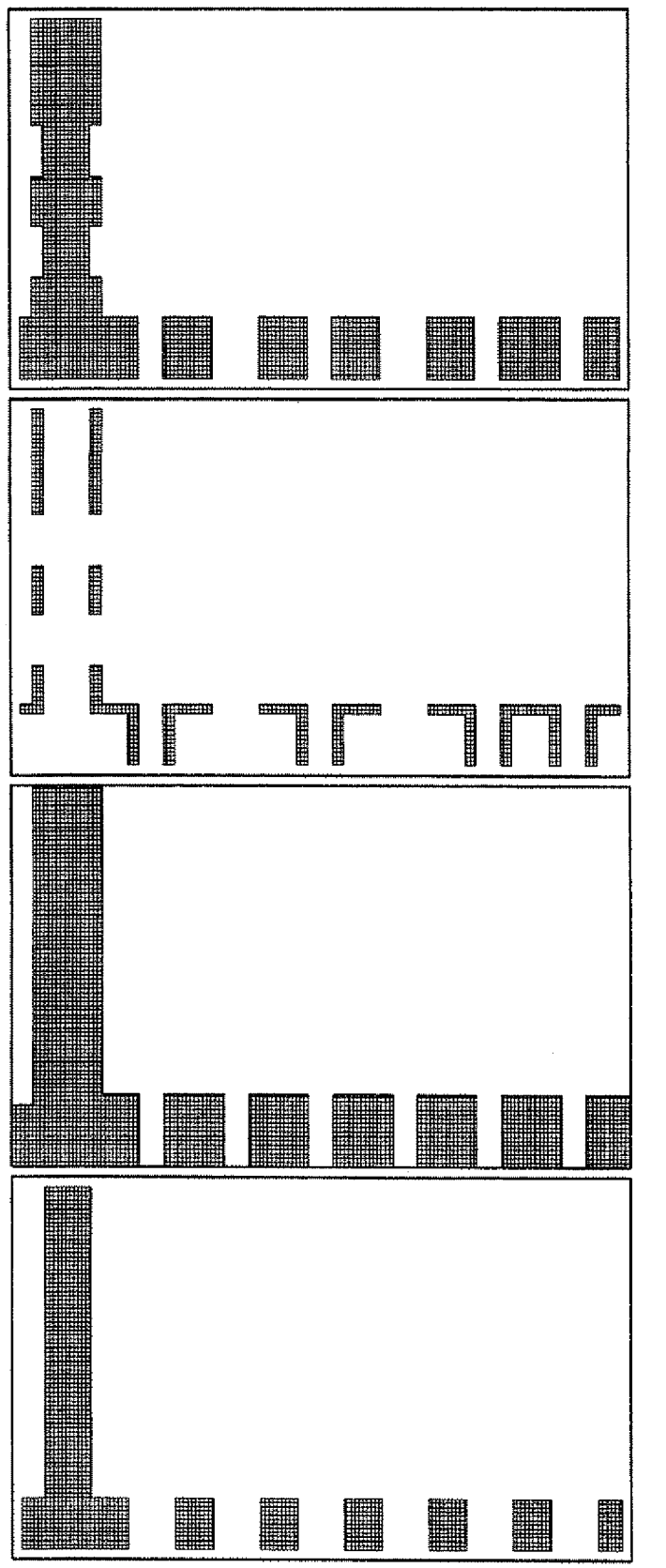
FIG. 13 shows the individual steps described above for the yellow primary color.

FIG. 13 shows the individual steps described above for the yellow primary color. The image step 1 shows the pure yellow regions from the original, image step 2 shows the enlarged regions, image step 3 shows the section with the darker colors and image step 4 shows the pure yellow color added to this.

Figure 14:
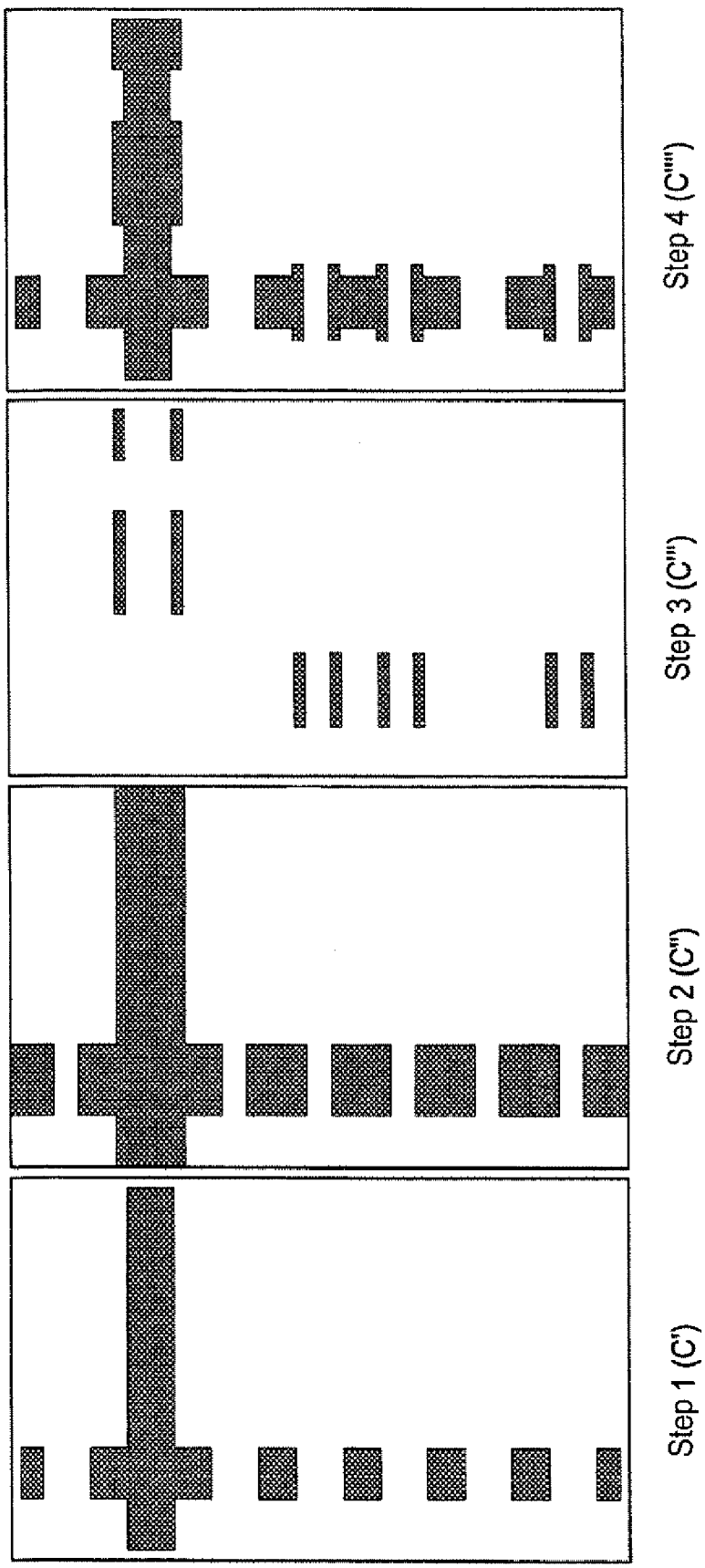
FIG. 14 shows the individual steps for the cyan primary color.

FIG. 14 shows the individual steps for the cyan primary color. The image step 1 shows the pure cyan regions from the original, image step 2 shows the enlarged regions, image step 3 shows the section with the darker colors and image step 4 shows the pure cyan color added to this.

Figure 15:
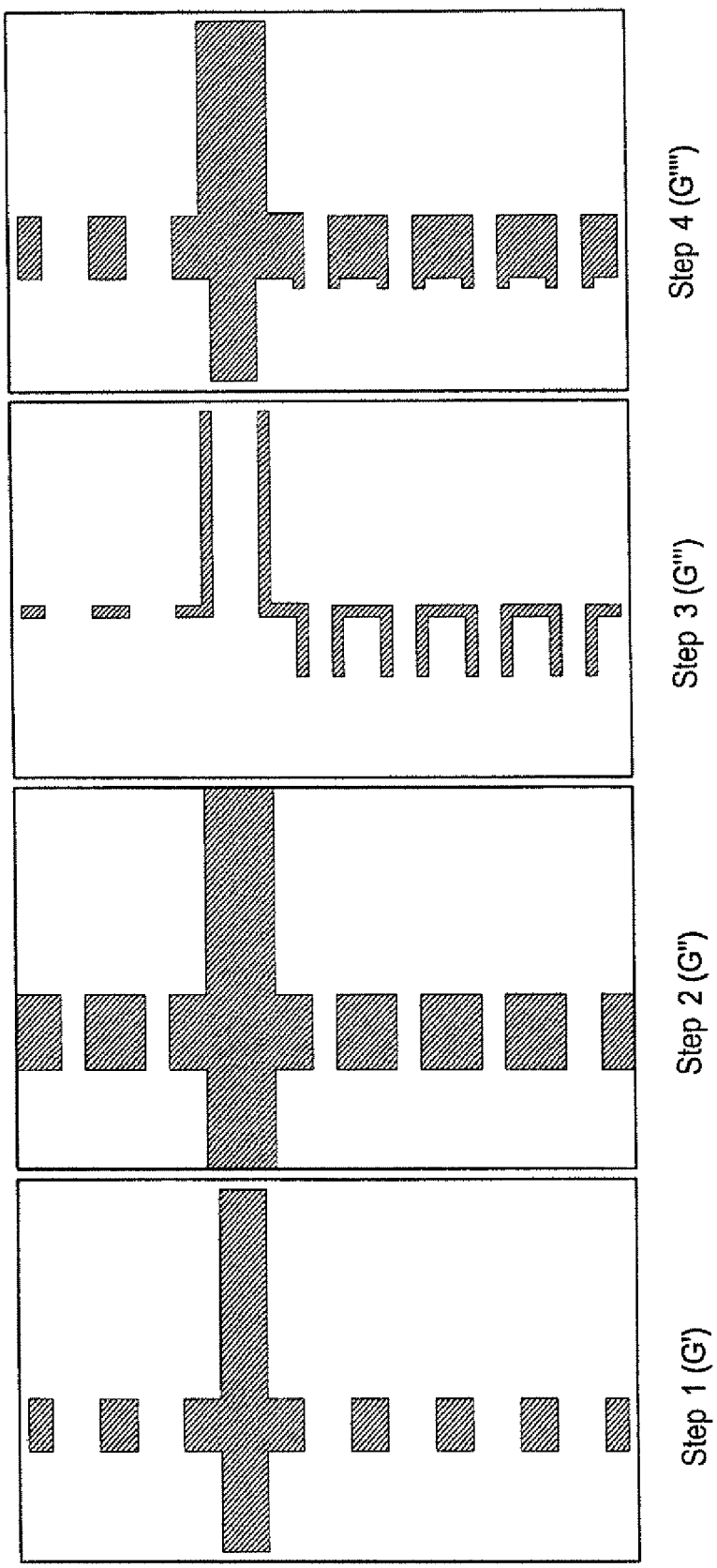
FIG. 15 shows the individual steps for the green primary color.

FIG. 15 shows the individual steps for the green primary color. The image step 1 shows the pure green regions from the original, image step 2 shows the enlarged regions, image step 3 shows the section with the darker colors and image step 4 shows the pure green color added to this.

Figure 16:
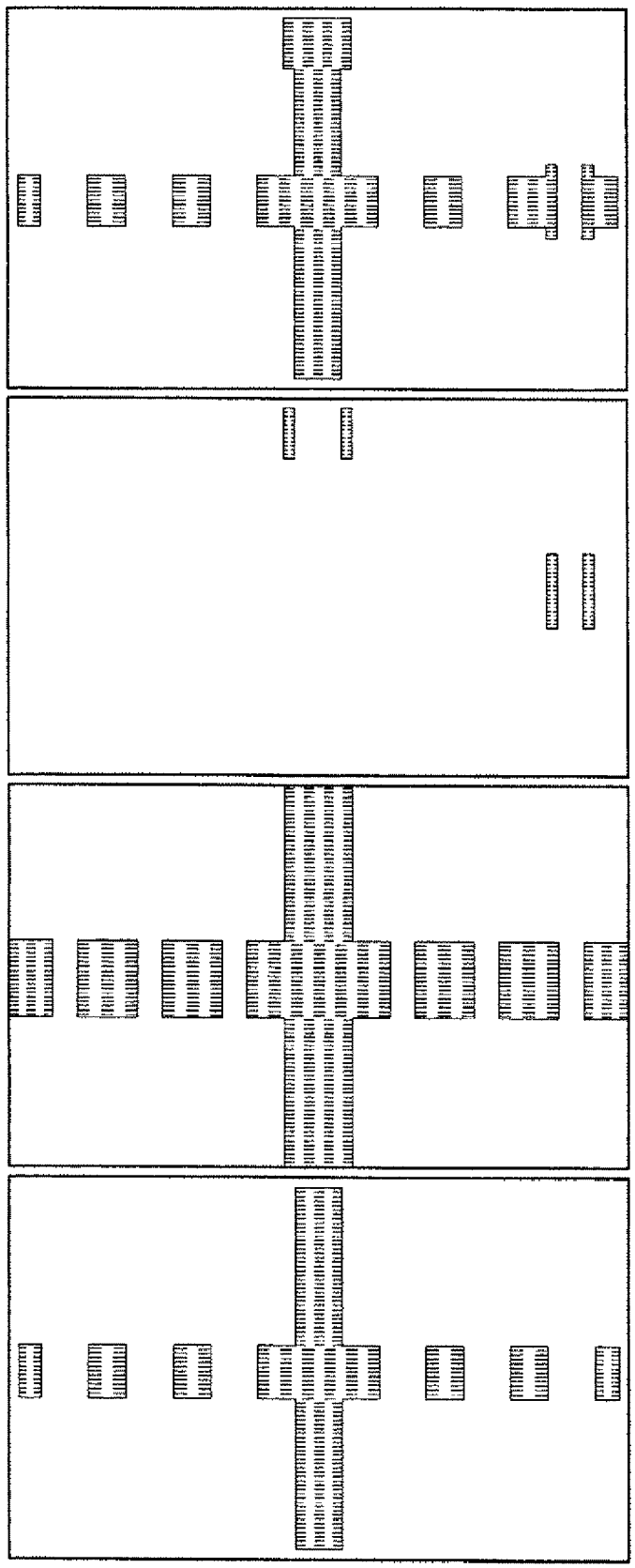
FIG. 16 shows the individual steps for the magenta primary color.

FIG. 16 shows the individual steps for the magenta primary color. The image step 1 shows the pure magenta regions from the original, image step 2 shows the enlarged regions, image step 3 shows the section with the darker colors and image step 4 shows the pure magenta color added to this.

Figure 17:
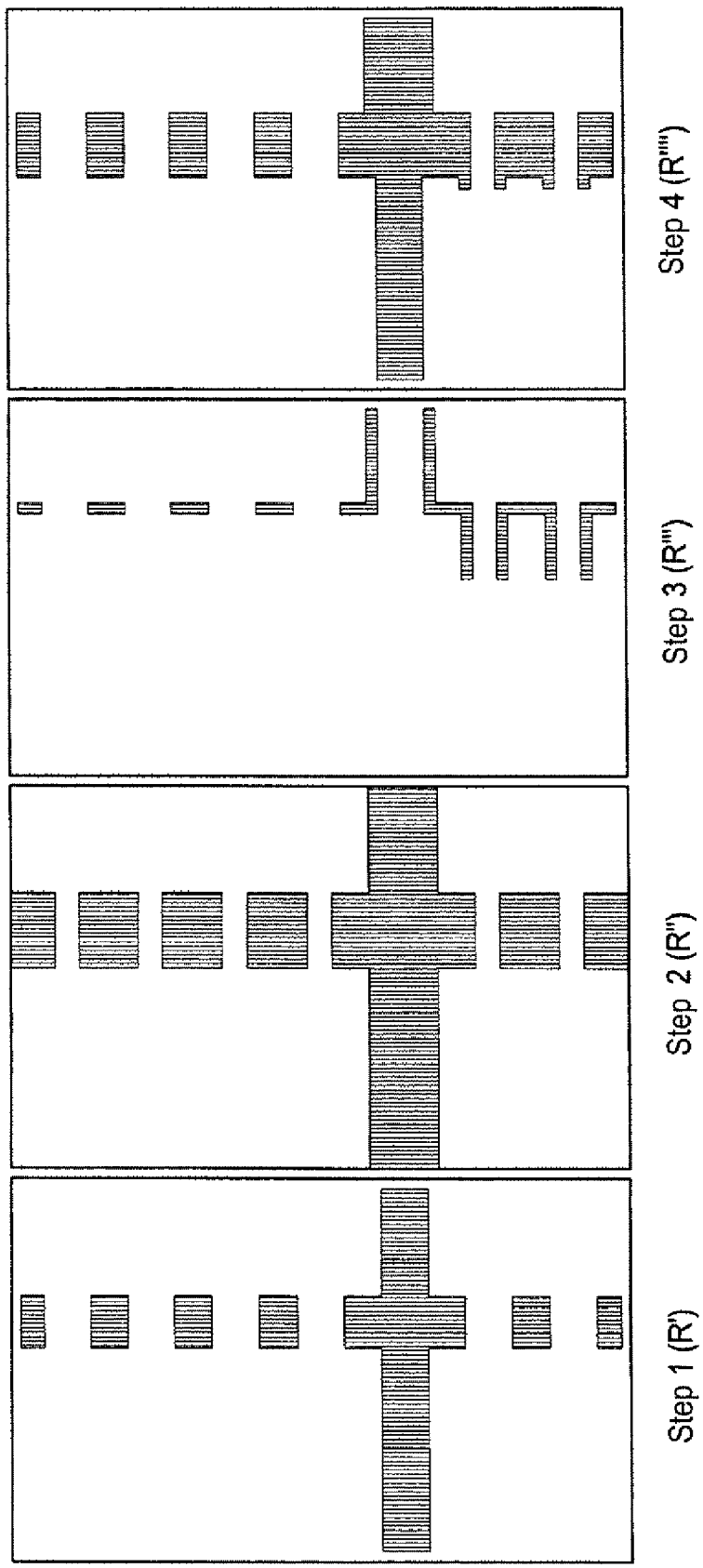
FIG. 17 shows the individual steps for the red primary color.

FIG. 17 shows the individual steps for the red primary color. The image step 1 shows the pure red regions from the original, image step 2 shows the enlarged regions, image step 3 shows the section with the darker colors and image step 4 shows the pure red color added to this.

Figure 18:
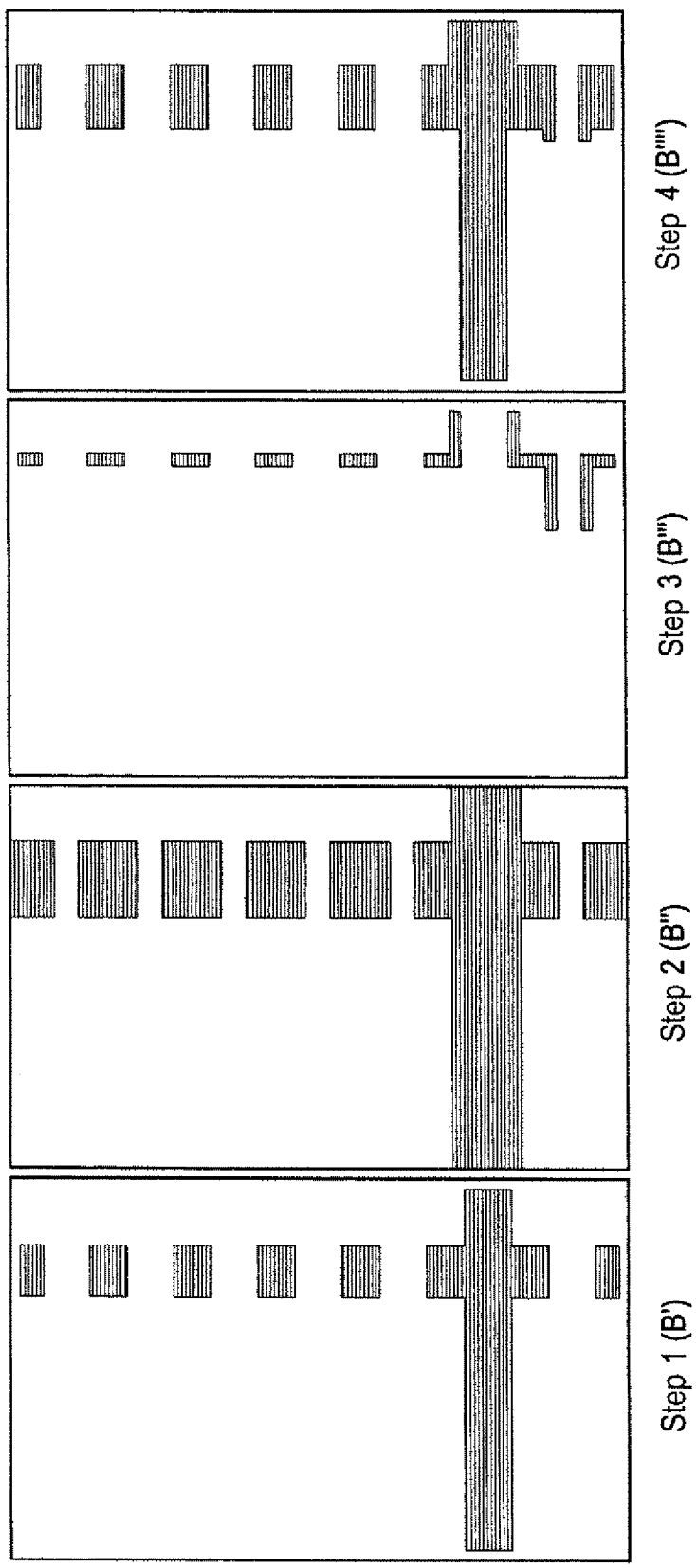
FIG. 18 shows the individual steps for the blue primary color.

FIG. 18 shows the individual steps for the blue primary color. The image step 1 shows the pure cyan regions from the original, image step 2 shows the enlarged regions, image step 3 shows the section with the darker colors and image step 4 shows the pure blue color added to this.

FIG. 19A shows step 5 for the yellow color separation, FIG. 19B shows step 5 for the cyan color separation and FIG. 19C shows step 5 for the magenta color separation.

Figure 20B:
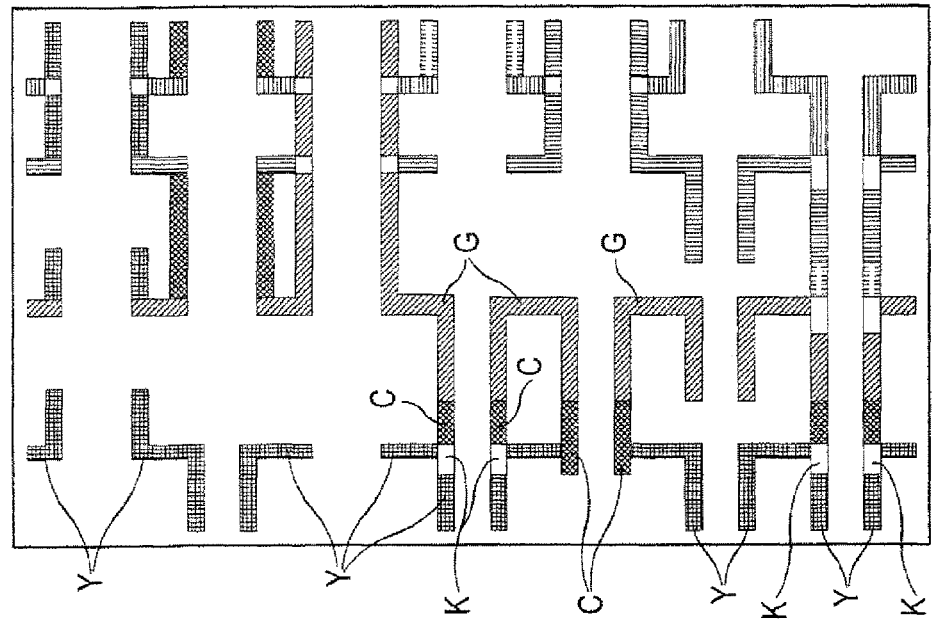
FIG. 20B shows portions that are to be added via the trapping.
Figure 20A:
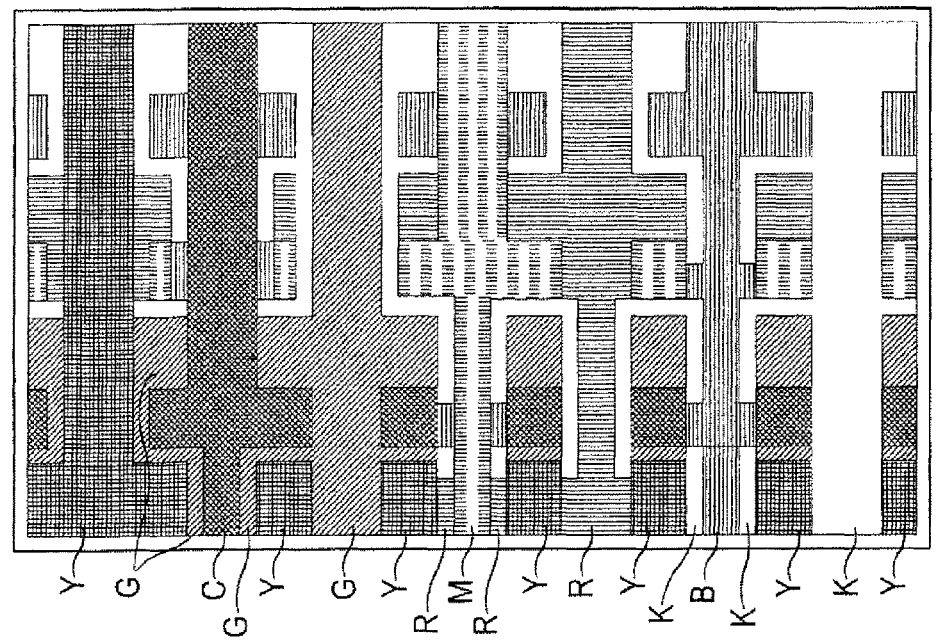
FIG. 20A shows the result of three color separations placed atop one another.

If these three color separations are placed atop one another and printed with the black plane, some colors overlap that then occur mostly black as combination colors. The result is shown in FIG. 20A. FIG. 20B shows the portions that are to be added via the trapping. These portions can already mutually overlap.

The black plane was not changed in the described examples. Naturally, in a modified method one can (insofar as is possible) convert CMYK into CMY (+$\Delta$K) and subsequently revert back again to CMYK.

For comprehensibility the operations have been listed individually. However, steps can be merged for an acceleration.

A pixel-based trapping method was described above for full color image point data (for example YMCK) that are respectively coded in 2 bits (bi-level data) for each color. The described method is, however, also suitable for a corresponding pixel-based trapping of what is known as highlight color data (HLC data). The method for HLC data should subsequently be described in detail.

As in the trapping for full color data, in principle five steps can be provided for the bitmap trapping given HLC data.
  Step 1 Filtering of the pure primary colors
  Step 2 Enlargement
  Step 3 Filter enlargement given darker colors that do not contain the current color
  Step 4 Mixing with pure original primary color
  Step 5 Mixing with combination colors However, given HLC data it is possible to not take combination colors (for example R=M|Y) into account, such that here the step 5 is not necessary.

Highlight Color Images with 2 Colors

When the image data describe two colors, for example black K and a highlight color color H, the method can proceed as follows:

In step 1 a further plane (H') is generated from the two planes (H, K), with:

$$H' = H \&\sim K$$

($\sim$ indicates negation, from 0 to 1 and from 1 to 0)

The content of this plane is enlarged in step 2. The method described in PCT/EP2004/007000 can again be used for this. Contiguous objects of the planes can thereby be enlarged by, for example, up to 24 pixels. However, only a few pixels' (for example at most one to three pixels') enlargement are needed for the trapping problem.

$$H'' = V(H)$$

In step 3 the darker color (thus here black) is taken into account. The pure overlap is determined $$H''' = K \& H''$$

The pure overlap is mixed with the original highlight color in step 4.

$$H'''' = H''' | H$$

Steps 3 and 4 can in turn be combined as a single step into H''''=(H & H'')|H.

Highlight Color Images with 3 Colors

In contrast to the treatment of full colors or corresponding data, given which the primary colors C, M, Y, K or R, G, B are firmly determined with their brightnesses, HLC can deal with colors of different or identical brightnesses that are different from application to application, in particular from printing device to printing device. In this case the brightness of the HLC colors is therefore determined and fed from outside to the trapping system, on the basis of which it is decided which color is trapped relative to which other color. If both HLC colors have the same brightness (or deviate only slightly from one another within a predefined tolerance range), the colors are thus no longer trapped against one another but are respectively trapped only against black.

If the two HLC colors are designated with H1 and H2, two cases are then to be differentiated:
  1. H1<H2. (Brightness of H1 is equal to or approximately equal to the brightness of H2)
  2. H1<H2. (Brightness of H1 is less than the brightness of H2).

In case 1 the steps 1-4 of the method are respectively implemented for both HLCs.

In case 2 only H1 is trapped against K and H2 is trapped against K and H1.

The aforementioned steps 1-4 of the method are implemented again for the padding of H1 only against K. In the following the steps 1-5 are described for the padding of H2 against K and H1.

In step 1 a further plane (H2') is generated from the three planes (H1, H2, K) ($\sim$ indicates negation, from 0 to 1 and from 1 to 0):

$$H2' = H2 \&\sim(K|H1)$$

The content of this plane is enlarged in step 2. The method described in PCT/EP2004/007000 can again be applied for this. Contiguous objects of the planes can thereby be enlarged by up to 24 pixels. However, only a few pixels' (for example at most one to three pixels') enlargement is needed for the trapping problem.

$$H2''=V(H2')$$

In step 3 the darker color (thus black) is taken into account. The pure overlap is determined $$H2'''=(K|H1)\&H2''$$

The pure overlap is mixed with the original HLC in step 4.

$$H2''''=H2'''|H2$$

The steps 3 and 4 can in turn be combined into H2''''= ((K|H1) & H2'')|H2.

Continuative Aspects of the Preferred Embodiment

Given filigree objects such as, for example, fine lines or small letters, upon trapping "shadow images" can arise on rasters when the object measure (such as, for example, line thicknesses) is smaller than the required trap width. Given fine lines, for example, a trapped line is then detected in addition to the original line. This situation should not appear or should have no significant visual effect given printing devices with a low trap width or register imprecision, for example of 3 pixels trap width maximum. Given printing devices with greater trap width, under the circumstances these effects have an effect in an unacceptable manner. The print image can thereby be degraded by the trapping relative to a print image generated without trapping. In order to be able to also utilize an advantageous trapping for such print devices, it is proposed to implement the trapping only given "large" objects and to leave the original given small objects.

An object detection or an object-dependent processing is inherently not provided given a pure bitmap trapping. However, with bitmap operations all objects of a plane can be enlarged with justifiable effort with the method described in PCT/EP2004/007000 or with the rule V cited above. With slight modifications the method described there can also be utilized to reduce objects. If this method is used to reduce all objects, for example by 3 pixels, and is subsequently used again to enlarge by the same amount, all objects whose dimensions are smaller than 7 pixels are thus eliminated, The trapping can then only be applied to the plane resulting in such a manner and can subsequently overlay the original plane again. A suitable trapping for filigree objects is thereby possible.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

We claim:

1. A method for trapping of image data, comprising the steps of:
   providing the image data in an initial image per image point as color separations of colors yellow, magenta, cyan and black;
   generating objects with adjacent additional image points according to an object rule around image points of various of said color separations of the initial image so that extended color separation data are created;
   comparing the adjacent additional image points of a color separation per image point with corresponding image points of the initial image;
   at a coordinate of the respective adjacent image point, making a decision as to whether the additional image point is placed in the respective color separation dependent on data of the respective corresponding initial image image point; and
   transforming image data of the color separations yellow, magenta, and cyan into a color space of colors yellow, magenta, cyan, red, green and blue, wherein the transformation occurs according to the rules:

| | | |
|---|---|---|
| C' = | C & ~M & ~Y & ~K = | C & ~(M \| Y \| K) |
| M' = | M & ~C & ~Y & ~K = | M & ~(C \| Y \| K) |
| Y' = | Y & ~C & ~M & ~K = | Y & ~(C \| M \| K) |
| R' = | M & Y & ~C & ~K = | M & Y & ~(C \| K) |
| G' = | C & Y & ~M & ~K = | C & Y & ~(M \| K) |
| B' = | C & M & ~Y & ~K = | C & M & ~(Y \| K), | where capital letters in said rules respectively designate a matrix of the image points of the associated color separations with corresponding initial letters of said respective colors, and K designates black.

2. The method according to claim 1 wherein objects with adjacent additional pixels are generated from the image points of the color separations yellow, magenta and cyan but not from the image points of the color black.

3. The method according to claim 1 whereby in a step to form the objects the image data are processed according to the rules:

| | | |
|---|---|---|
| C'' = V(C'), | M'' = V(M'), | Y'' = V(Y'), |
| R'' = V(R'), | G'' = V(G'), | B'' = V(B'), | where V designates the rule for the generation of the objects with extended image points.

4. The method according to claim 3 wherein the image data regarding the image points of a color separation are stored in an image point file and the following steps are implemented to form the objects:
   mapping of the image point file to a mapping file, and wherein all image points of the mapping file that lie within a predetermined distance d of corresponding image points in the image point file are placed.

5. The method according to claim 4 wherein the image points in the image point file and in the mapping file are arranged in rows and columns and a table with one-dimensional image point patterns is provided, a corresponding mapping point pattern being associated with each image point pattern; wherein groups of image points of one row of the image point file are compared with the image point patterns given the mapping in the direction of the rows; and wherein the mapping point pattern corresponding to the coinciding image point pattern is entered into the corresponding row at the corresponding position of the mapping file with an OR-link.

6. The method according to claim 4 wherein a distance is automatically varied dependent on a font size and/or a rastering and/or a granularity.

7. The method according to claim 3 wherein the following rules are used for decision as to whether corresponding color separation data of the initial image image point are extended by a value corresponding to the additional image point to generate a target image point value:

| | | |
|---|---|---|
| C''' = (M\|K) & C'', | M''' = | K & M'', |
| Y''' = (C \| M \| K) & Y''' | R''' = | ((M & C) \| K) & R'', |
| G''' (M \| K) & G'' | B' = | K & B''. |

8. The method according to claim 1 wherein intermediate image data are determined per image point from the image data of the initial image points and the additional image points.

9. The method according to claim 8 wherein the intermediate image data are calculated according to the rules:

| | |
|---|---|
| C'''' = C''' \| C', | M'''' = M''' \| M', |
| Y'''' = Y''' \| Y', | R'''' = R''' \| R', |
| G'''' = G''' \| G', | B'''' = B''' \| B'. |

10. The method according to claim 7 wherein the target image point values are calculated from the intermediate image data.

11. The method according to claim 7 wherein the target image point values data are determined according to the rules

| |
|---|
| C''''' = C'''' \| G'''' \| B'''', |
| M''''' = M'''' \| R'''' \| B'''', |
| Y''''' = Y'''' \| R'''' \| G''''. |

12. The method according to claim 1 wherein the image data are two-stage per image point.

13. The method according to claim 1 wherein the image data are more than two-stage per image point.

14. The method according to claim 1 wherein the trapping is implemented on bitmaps.

15. The method according to claim 1 wherein the trapping occurs independent of a ripping, separation or screening of bitmap objects of a PDL data stream that are integrated into the data stream.

16. The method according to claim 15 wherein the trapping occurs on a screen shot image, a graphic or a photo.

17. The method according to claim 1 wherein contiguous areas from bitmap-based image data are determined and are classified as objects, and then trapping techniques are applied per object.

18. A method for trapping of image data, comprising the steps of:
generating objects with adjacent additional image points according to an object rule around image points of various of said color separations of an initial image so that extended color separation data are created;
comparing the adjacent additional image points of a color separation per image point with corresponding image points of the initial image;
at a coordinate of the respective adjacent image point, making a decision as to whether the additional image point is placed in the respective color separation dependent on data of the respective corresponding initial image image point;
forming the image data comprising only data regarding two colors and a further color separation from the data of the two color separation per image point according to the rule $H'=H\&\sim K;$ determining contiguous image objects from the data of the further color separation and forming a further separation in which the image objects are enlarged according to the rule $H''=V(H);$ filtering a darker color from the further separation according to the rule $H'''=K\&H';$ and overlaying the separation so generated with the data of the original color separations according to the rule $H''''=H'''\|H.$ 19. The method according to claim 18 wherein the image data contain only data regarding two highlight color colors and regarding black and wherein various trapping rules are used dependent on a brightness difference between the two highlight color colors.

20. The method according to claim 19 wherein the method is executed in the case of substantially identical brightnesses of the two highlight color colors.

21. The method according to claim 19 wherein in the event of significantly different brightnesses of the highlight color colors data of a darker of the two highlight colors are trapped only against data of the black color and data of a lighter of the two highlight color colors are trapped against data of the other highlight color the black.

22. A method for trapping of image data, comprising the steps of:
generating objects with adjacent additional image points according to an object rule around image points of various color separations of an initial image so that extended color separation data are created;
comparing the adjacent additional image points of a color separation per image point with corresponding image points of the initial image;
at a coordinate of the respective adjacent image point, making a decision as to whether the additional image point is placed in the respective color separation dependent on data of the respective corresponding initial image image point; and
determining or establishing whether filigree are contained in the image data and forming an image separation in that image objects are initially shrunk according to a rule and then are enlarged again such that image objects whose measurements under-run a lower limit at least in one direction are eliminated from the image separation in the course of the reduction before further trapping method steps are applied.

23. A non-transitory computer program tangibly embodied on a computer readable medium, and, when executed by a computer said program performing a method for trapping of image data comprising the steps of:
providing the image data in an initial image per image point as color separations of colors yellow, magenta, cyan and black;
generating objects with adjacent additional image points according to an object rule around image points of various of said color separations of the initial image so that extended color separation data are created;
comparing the adjacent additional image points of a color separation per image point with corresponding image points of the initial image;
at a coordinate of the respective adjacent image point, making a decision as to whether the additional image point is placed in the respective color separation dependent on data of the respective corresponding initial image image point; and transforming image data of the color separations yellow, magenta, and cyan into a color space of colors yellow, magenta, cyan, red, green and blue, wherein the transformation occurs according to the rules:

| | | |
|---|---|---|
| C' = | C & ~M & ~Y & ~K = | C & ~(M \| Y \| K) |
| M' = | M & ~C & ~Y & ~K = | M & ~(C \| Y \| K) |
| Y' = | Y & ~C & ~M & ~K = | Y & ~(C \| M \| K) |

-continued

| | | |
|---|---|---|
| R' = | M & Y & ~C & ~K = | M & Y & ~(C \| K) |
| G' = | C & Y & ~M & ~K = | C & Y & ~(M \| K) |
| B' = | C & M & ~Y & ~K = | C & M & ~(Y \| K), | where capital letters in said rules respectively designate a matrix of the image points of the associated color separations with corresponding initial letters of said respective colors, and K designates black.

* * * * *